United States Patent
Chen et al.

(10) Patent No.: US 11,173,561 B1
(45) Date of Patent: Nov. 16, 2021

(54) METHOD FOR PROCESSING PROBE

(71) Applicant: METAL INDUSTRIES RESEARCH & DEVELOPMENT CENTRE, Kaohsiung (TW)

(72) Inventors: Tzu-Hung Chen, Kaohsiung (TW); Zhi-Wen Fan, Kaohsiung (TW); Wen-Chieh Wu, Kaohsiung (TW); Chun-Wei Chen, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 0 days.

(21) Appl. No.: 17/003,159

(22) Filed: Aug. 26, 2020

(30) Foreign Application Priority Data

Jun. 30, 2020 (TW) .................... 109122032

(51) Int. Cl.
  *B23H 5/08* (2006.01)
  *B23H 11/00* (2006.01)
  *B23H 9/00* (2006.01)
  *B23H 9/08* (2006.01)

(52) U.S. Cl.
  CPC ............ *B23H 5/08* (2013.01); *B23H 9/00* (2013.01); *B23H 9/08* (2013.01); *B23H 11/003* (2013.01)

(58) Field of Classification Search
  CPC ........... B23H 5/08; B23H 9/08; B23H 11/003
  See application file for complete search history.

(56) References Cited

U.S. PATENT DOCUMENTS

2018/0317959 A1* 11/2018 Bauer .................. B23H 9/08
2021/0187644 A1*  6/2021 Wu ..................... B24B 19/16

FOREIGN PATENT DOCUMENTS

CN         110125496 A  *  8/2019  ........... B23H 11/003

* cited by examiner

*Primary Examiner* — Nicholas A Smith
(74) *Attorney, Agent, or Firm* — Rosenberg, Klein & Lee

(57) ABSTRACT

The present application discloses a method for processing probe. Firstly, a clamping member of a rotation shaft is clamped with a workpiece, and then the workpiece is moved to a processed area by the rotation shaft. The workpiece is rotated by the rotation shaft, and an electrochemical process of the workpiece is performed under the rotation of the shaft and an electrolyte sprayed between the workpiece and the polished module. During the performing of the electrochemical process, it can be that the rotation shaft is moved a processing distance or the included angle of the polish module is changed, for a probe being accomplished from the workpiece. Thereby, the abrasion of the polish module is lower and the performance for processing the probe under the electrochemical process.

10 Claims, 17 Drawing Sheets

METHOD FOR PROCESSING PROBE

FIELD OF THE INVENTION

The present invention relates generally to a processing method, and particularly to a method for processing probe.

BACKGROUND OF THE INVENTION

The manufacturing method for probes according to the prior art is to drive a grinding wheel to grind a rod material to a probe. Alternatively, a rod material is placed on a laid-flat sandpaper and grinded back and forth. Either way, the consumption of grinding wheels and sandpapers is extremely rapid.

Moreover, according to the method for manufacturing probes according to the prior art, a rod material is first grinded by the grinding wheel of a grinder or a sandpaper. Then the shape of the probe is examined and checked if damages exist. Since the above method adopts manual grinding, depending on the grinding force, angle, and direction by the operator, different grinding results will be produced. In addition, the properties of the rod material, such as hardness and density, also influence the result of forming a probe form a rod material. Thereby, repeated grinding and confirmation are required to ensure the shape of probes. It is the repeated confirmation and grinding makes the manufacturing time long. Besides, the probability of damages is high, which makes the manufacturing time even longer.

Furthermore, as modern technologies develop, the chip size shrinks gradually, urging the size of the probes for testing shrinks accordingly. Thereby, in addition to the manufacturing method according to the prior art, there is also an electrochemical machining (ECM) method to manufacture probes with sizes smaller than 200□m. The ECM method is to perform machining by electrochemical dissolution using a metal workpiece as the anode. The method is not an electrolysis machining method according to the prior art. It can be applied to machining extremely hard materials, such as tool steel, hard alloy, superalloy, or titanium alloy, or the materials difficult to be processed by the methods according to the prior art. The main requirement of the ECM method is that the object under machining must be conductive. While performing ECM, the cutting tool is the cathode and the object under machining is the anode. Under low-voltage and high-current condition, the electrolyte can circulate rapidly through the electrodes and the object under machining under pressure for electrolysis. The cutting tool moves along the machining path and does not contact the object under machining. No sparks will occur in the process. The object under machining is immersed in the electrolyte and dissolved in the machining process. Then the cutting tool is used to shape the object under machining.

Although the ECM method can manufacture the desired shape of the object under machining rapidly, the electrolysis must be performed under a high pressure. Thereby, expensive instruments and equipment must be invested before the machining method can be performed.

According to the three methods described above, it is known that grinding using grinders or sandpapers takes longer processing time has higher probability of damages. Although the ECM method can manufacture the shape of object under machining rapidly and accurately, the costly machines required make the manufacturing costs expensive.

Accordingly, to solve the endurance problem of grinding wheels and sandpapers as described above, improve the production efficiency for probes, shorten the processing time effectively, and reduce the manufacturing costs by avoiding special instruments and equipment, the present invention adopts an electrolysis method and an improved probe processing device to solve the above problems.

According to the above description, the present invention provides a method for processing probe, which uses an ECM process to adjust the angle of probe tip after forming. In addition, negative charges are provided to the workpiece and positive charges are provided to the grinding module. By using the electrolyte, the workpiece and the angle adjusting member are connected electrically to form the desired shape of probes.

SUMMARY

An objective of the present invention is to provide a probe processing device, which can shorten the processing time, increase the production efficiency, reduce the consumption of grinding members, and process to produce probes rapidly.

To achieve the above objective, the present invention provides a method for processing probe, which comprises steps of: holding a workpiece by using a holding member on a spinning shaft; controlling the spinning shaft to move the workpiece to the processing location; using an adjusting module to set a grinding module at the processing location to form a first angle and a second angle with the central line of the workpiece; and controlling the spinning shaft to move forward a processing distance and rotate according to the processing location, transporting an electrolyte to a space between the grinding module and the workpiece in the meanwhile, and so as processing the workpiece to form a probe by processing the workpiece. The processing distance is inversely proportional to the first angle and the second angle. The workpiece or the spinning shaft is connected electrically to a positive electrode; the grinding module is connected electrically to a negative electrode. Thereby, the present invention provides a high-efficient method for processing prove and reducing the consumption of the grinding module.

According to an embodiment of the present invention, in the step of using an adjusting module to set a grinding module at the processing location to have a first angle and a second angle with the central line of the workpiece, a first adjusting structure of the adjusting module is used to set a first grinding member of the grinding module to have a first angle with the central line of the workpiece, and a second adjusting structure of the adjusting module is used to set a second grinding member of the grinding module to have a second angle with the central line of the workpiece.

According to an embodiment of the present invention, the first angle is equal to the second angle.

According to an embodiment of the present invention, the first angle and the second angle range between 1° and 22.5°.

According to an embodiment of the present invention, the processing distance ranges from greater than 200 micrometers to smaller than or equal to 17 millimeters.

According to an embodiment of the present invention, in the step of holding a workpiece using a holding member on a spinning shaft, a spin driver and the holding member are connected.

The present invention provides another method for processing probe, which comprises steps of: holding the workpiece using the holding member on the spinning shaft; controlling the spinning shaft to move and position the workpiece to the processing location; using the adjusting module to set the grinding module at the processing location to have the first angle and the second angle with the central line of the workpiece; and controlling the grinding module to change from the first processing angle to the first angle and from the second processing angle to the second angle according to the processing location, controlling the spin of the spinning shaft, and transporting the electrolyte to the space between the grinding module and the workpiece for processing the workpiece to a probe. The workpiece or the spinning shaft is connected electrically to a positive electrode; the grinding module is connected electrically to a negative electrode.

According to an embodiment of the present invention, in the step of using an adjusting module to set a grinding module at the processing location to have a first angle and a second angle with the central line of the workpiece, a first adjusting structure of the adjusting module is used to set a first grinding member of the grinding module to have a first angle with the central line of the workpiece, and a second adjusting structure of the adjusting module is used to set a second grinding member of the grinding module to have a second angle with the central line of the workpiece.

According to an embodiment of the present invention, the first angle is equal to the second angle.

According to an embodiment of the present invention, the first angle and the second angle range between 1° and 22.5°.

DETAILED DESCRIPTION

The processing method of the probe grinding device according to the prior art drives a grinding wheel to grind probe directly or grinds probes back and forth on a flat sandpaper. The consumption of grinding wheels or sandpapers is quite rapid. Thereby, how to reduce the consumption of materials and increase the manufacturing speed are the problems to be solved.

The present invention improves the drawbacks in the processing methods according to the prior art, shortens the processing time, increases the production efficiency, lowers the consumption of grinding members such as grinding wheels and sandpapers, and processes to give the desired probes rapidly. By using the electrolysis method and the angle adjusting devices, the repeated processes and confirmation in the methods according to the prior art are no more required. The desire probe specifications can be manufactured directly.

In the following description, various embodiments of the present invention are described using figures for describing the present invention in detail. Nonetheless, the concepts of the present invention can be embodied by various forms. Those embodiments are not used to limit the scope and range of the present invention.

Figure 1:
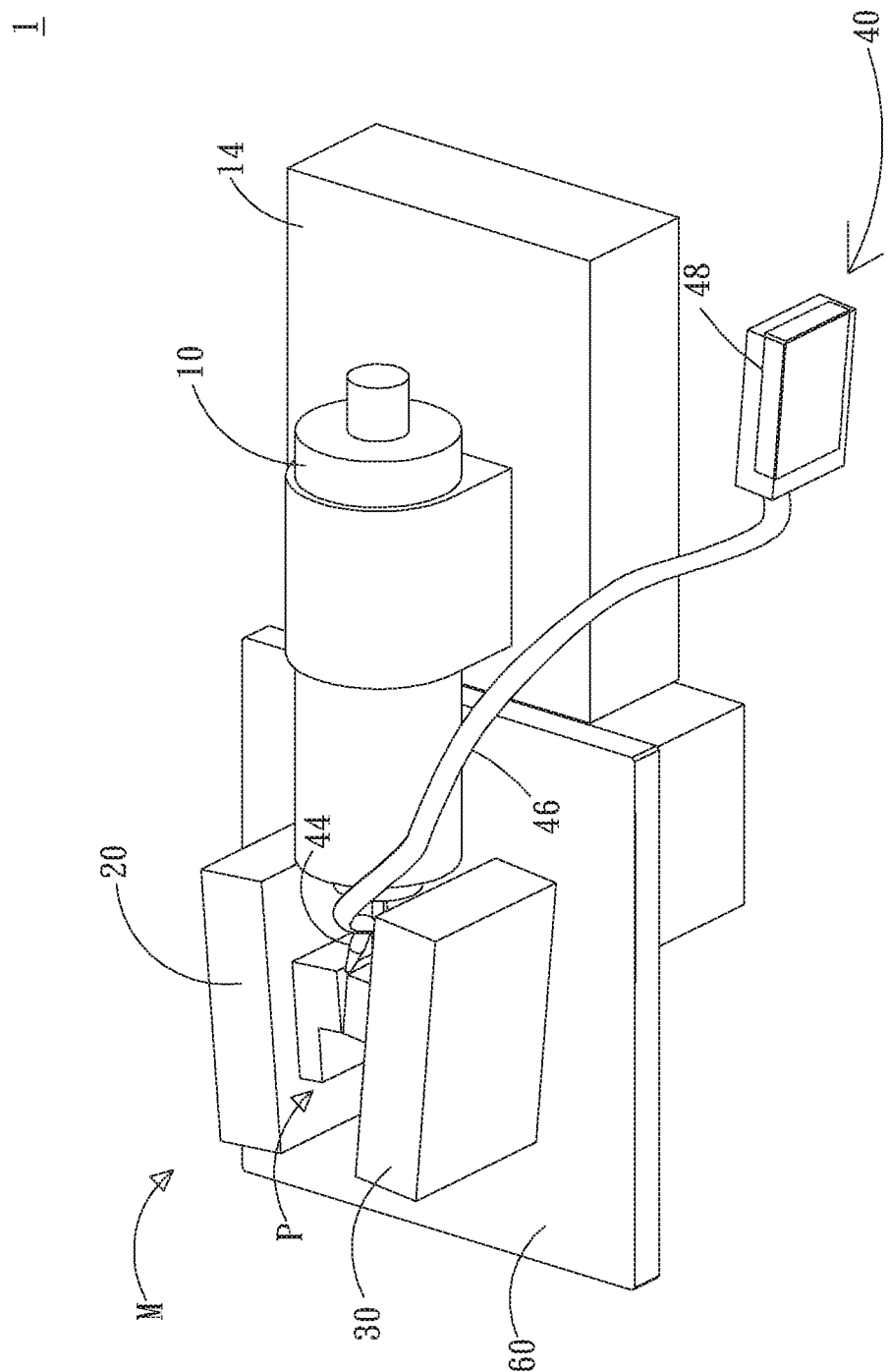
FIG. 1 shows a schematic diagram of the device according to an embodiment of the present invention.

First, please refer to FIG. 1, which shows a schematic diagram of the device according to an embodiment of the present invention. As shown in the Figure, a probe processing device 1 comprises a spinning shaft 10, an adjusting module M, a grinding module P, an electrolyte transport member 40, and a base 60. The adjusting module M includes a first adjusting structure 20 and a second adjusting structure 30.

Figure 2:
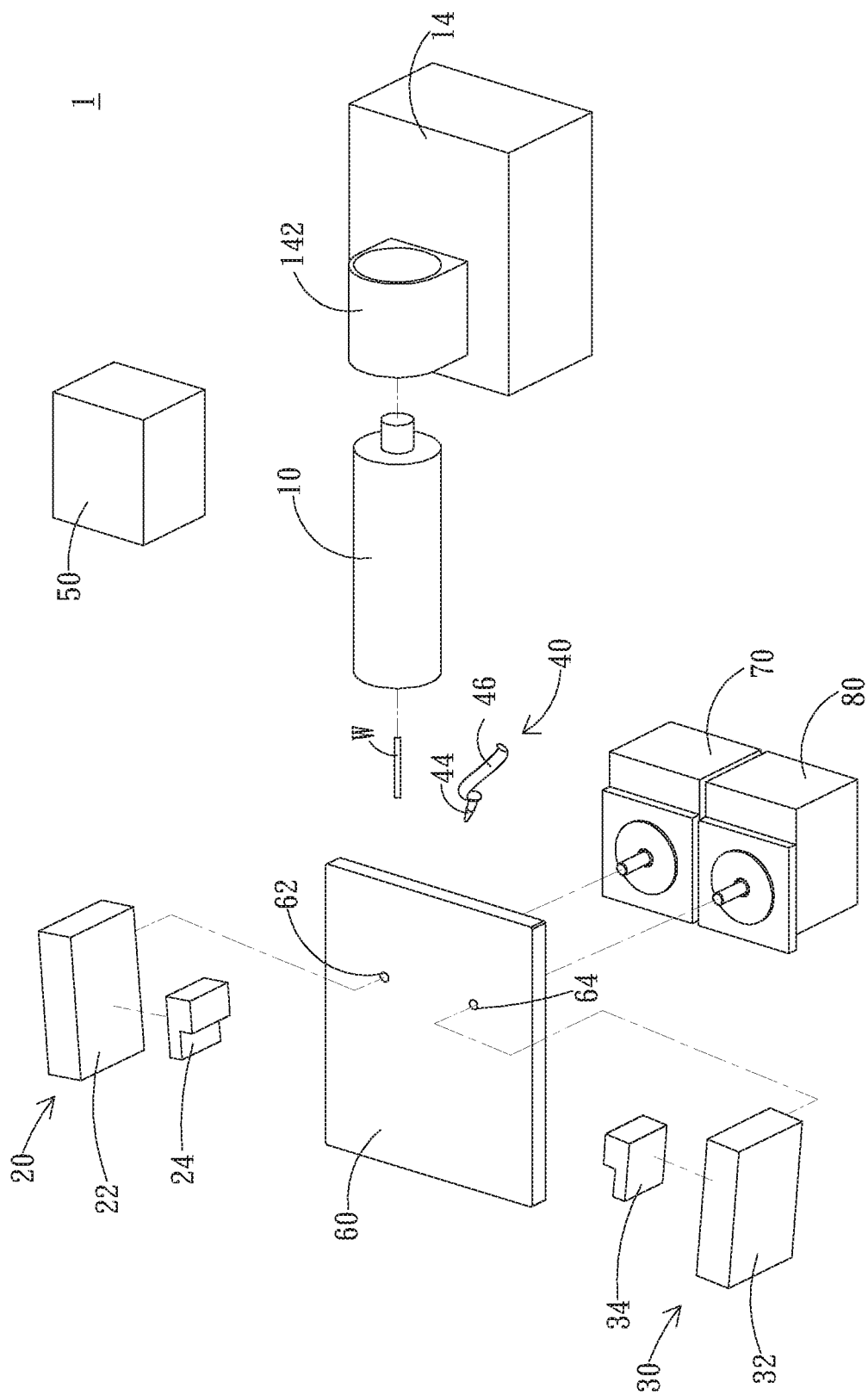
FIG. 2 shows an exploded view of the device according to an embodiment of the present invention.

Please refer to FIG. 2, which shows an exploded view of the device according to an embodiment of the present invention. The spinning shaft 10 includes a holding member 12 and a driving member 14. One side of the spinning shaft 10 is connected to the holding member 12. The holding member 12 is used for holding a workpiece W. The spinning shaft 10 is fixed to the driving member 14. The driving member 14 drives the spinning shaft 10 to perform uniaxial movement (such as the x-axis). According to an embodiment of the present invention, a fixing base 142 is used to fix the spinning shaft 10. Nonetheless, the present invention is not limited to the embodiment. Besides, the spinning shaft 10 further includes a spin driver 18 disposed inside the body of the spinning shaft 10 and connected with the holding member 12. Then the spin driver 18 can drive the holding member 12 to spin.

Figure 3:
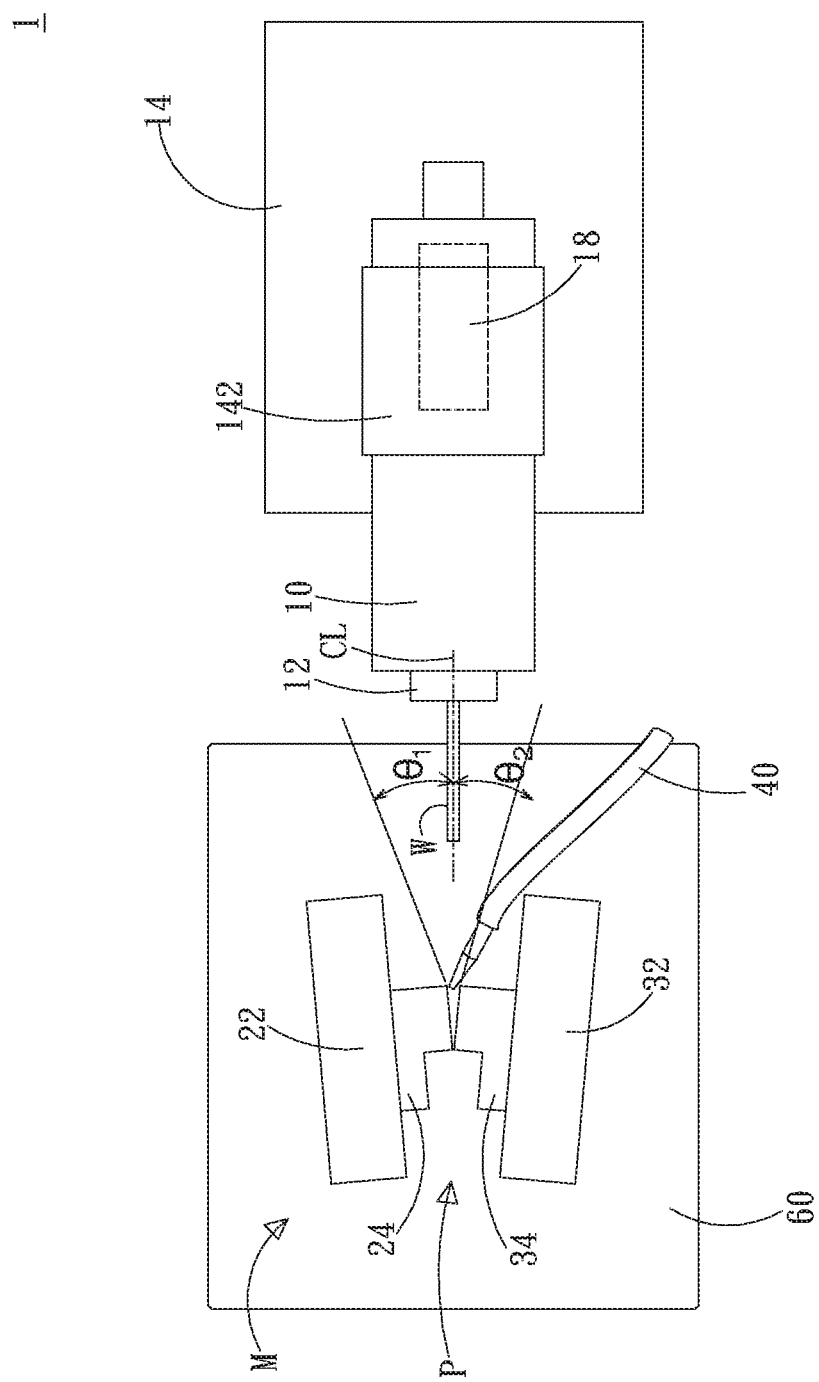
FIG. 3 shows a top view of the device according to an embodiment of the present invention.

In addition, the first adjusting structure 20 and the second adjusting structure 30 are disposed on a base 60 and on both sides of the workpiece W opposing to each other, respectively. It means that the first adjusting structure 20 and the second adjusting structure 30 are opposing to each other with the workpiece W located at the center. The first adjusting structure 20 includes a first angle adjusting member 22, which includes a first grinding member 24 of the grinding module P. Furthermore, a first grinding surface 242 of the first grinding member 24 forms a first angle $\theta_1$ with the central line CL of the workpiece W. Moreover, the second adjusting structure 30 includes a second angle adjusting member 32, which includes a second grinding member 34 of the grinding module P. Furthermore, please refer to FIG. 3, which shows a top view of the device according to an embodiment of the present invention. As shown in the figure, a second grinding surface 342 of the second grinding member 24 forms a second angle $\theta_2$ with the central line CL of the workpiece W. The first angle $\theta_1$ and the second angle $\theta_2$ can be identical angles.

The first adjusting structure 20 and the second adjusting structure 30 are driven by a first driving motor 70 and a second driving motor 80, which are disposed below a base 60. Furthermore, the first driving motor 70 passes through a first hole 62 of the base 62 and is connected to the first angle adjusting member 22; the second driving motor 80 passes through a second hole 64 of the base 62 and is connected to the second angle adjusting member 32. The first driving motor 70 and the second driving motor 80 are, but not limited to, stepper motors.

Besides, the electrolyte transport member 40 is disposed between the first adjusting structure 20 and the second adjusting structure 30 and above the workpiece W. The electrolyte transport member 40 is used for transporting an electrolyte 42 and includes a nozzle 44, a tube 46, and an electrolyte container (not shown in the figure). One side of the tube 46 is connected to the nozzle 44 while the other side thereof is connected to a pump device (not shown in the figure). The pump device is disposed inside the electrolyte container. The electrolyte transport member 40 uses the pump device to pump the electrolyte 42.

Next, a power supply 50 includes one or more positive terminal 52 and one or more negative terminal 54. The one or more positive terminal 52 is connected to the workpiece W or the holding member 12. The one or more negative terminal 54 is connected to the first adjusting structure 20 and the second adjusting structure 30. The electrolyte 42 flows through the workpiece W, the first adjusting structure 20, and the second adjusting structure 30 and connects electrically to produce an electrolysis procedure.

The method for processing probe according to the present invention improves traditional manual fabrication of probes using grinders or sandpapers. The manual method is time-consuming and laborious. A minor false operation might lead to scrapping of probes. The one or more negative terminal 54 is connected to the first adjusting structure 20 and the second adjusting structure 30. The one or more positive terminal 52 is connected to the workpiece W. The electrolyte 42 enables the workpiece W, the first adjusting structure 20, and the second adjusting structure 30 to conduct electrically and start the electrochemical procedure. By using the electrolysis procedure, the probe specifications can be manufactured rapidly.

Figure 4:
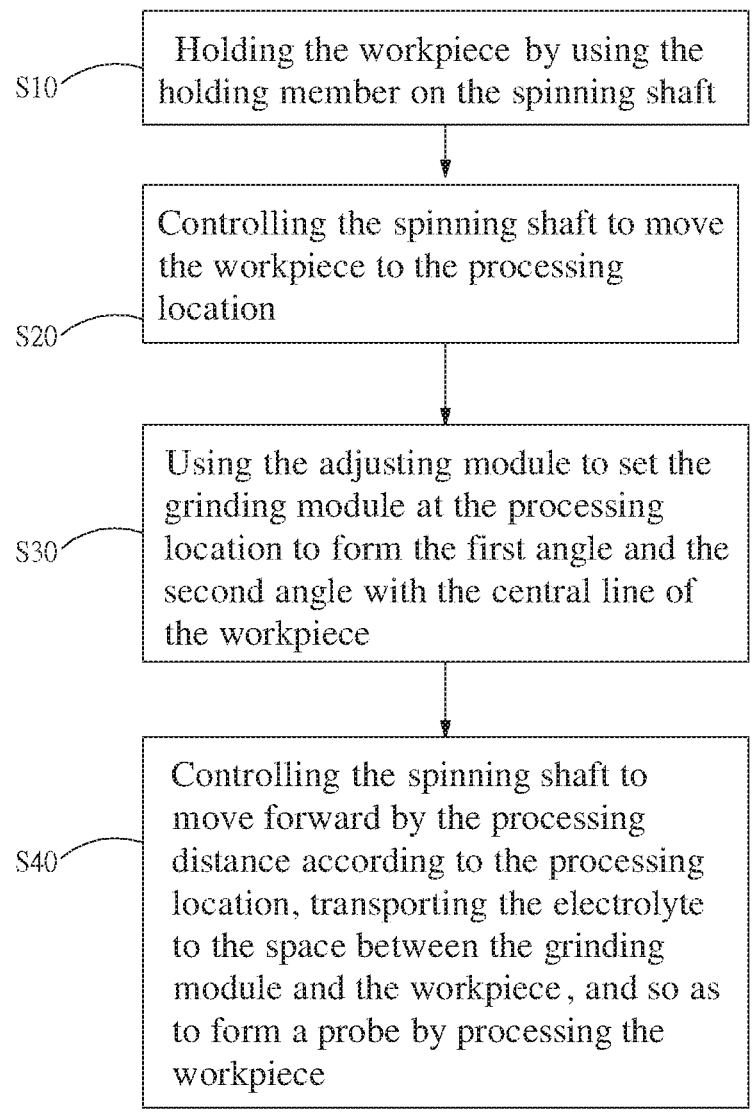
FIG. 4 shows a flowchart of the method according to an embodiment of the present invention.

The process for using the probe processing device 1 according to the present invention is shown in FIG. 4, which shows a flowchart according an embodiment of the present invention. As shown in the figure, the method comprises the following steps:

Step S10: Holding the workpiece by using the holding member on the spinning shaft;

Step S20: Controlling the spinning shaft to move the workpiece to the processing location;

Step S30: Using the adjusting module to set the grinding module at the processing location to form the first angle and the second angle with the central line of the workpiece; and Step S40: Controlling the spinning shaft to move forward a processing distance and rotate according to the processing location, transporting an electrolyte to a space between the grinding module and the workpiece in the meanwhile, and so as processing the workpiece to form a probe by processing the workpiece.

The steps for using the device according to the present invention include the steps S10 to S40. To better describe the process of the method for processing probe, an example will used. Please refer to FIG. 5A to FIG. 5D, which show schematic diagrams of processing probe according to an embodiment of the present invention.

Figure 5A:
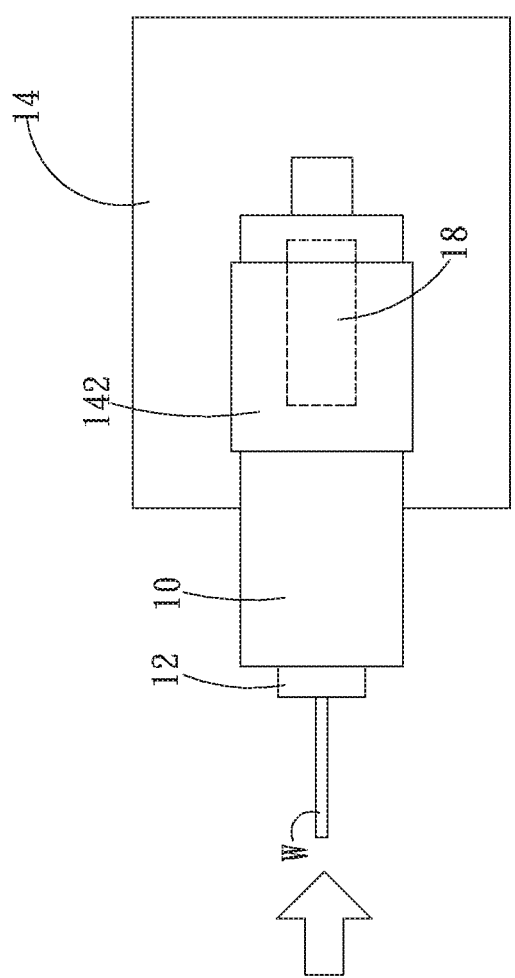
FIG. 5A to FIG. 5E show schematic diagrams of processing probe according to an embodiment of the present invention.
Figure 5B:
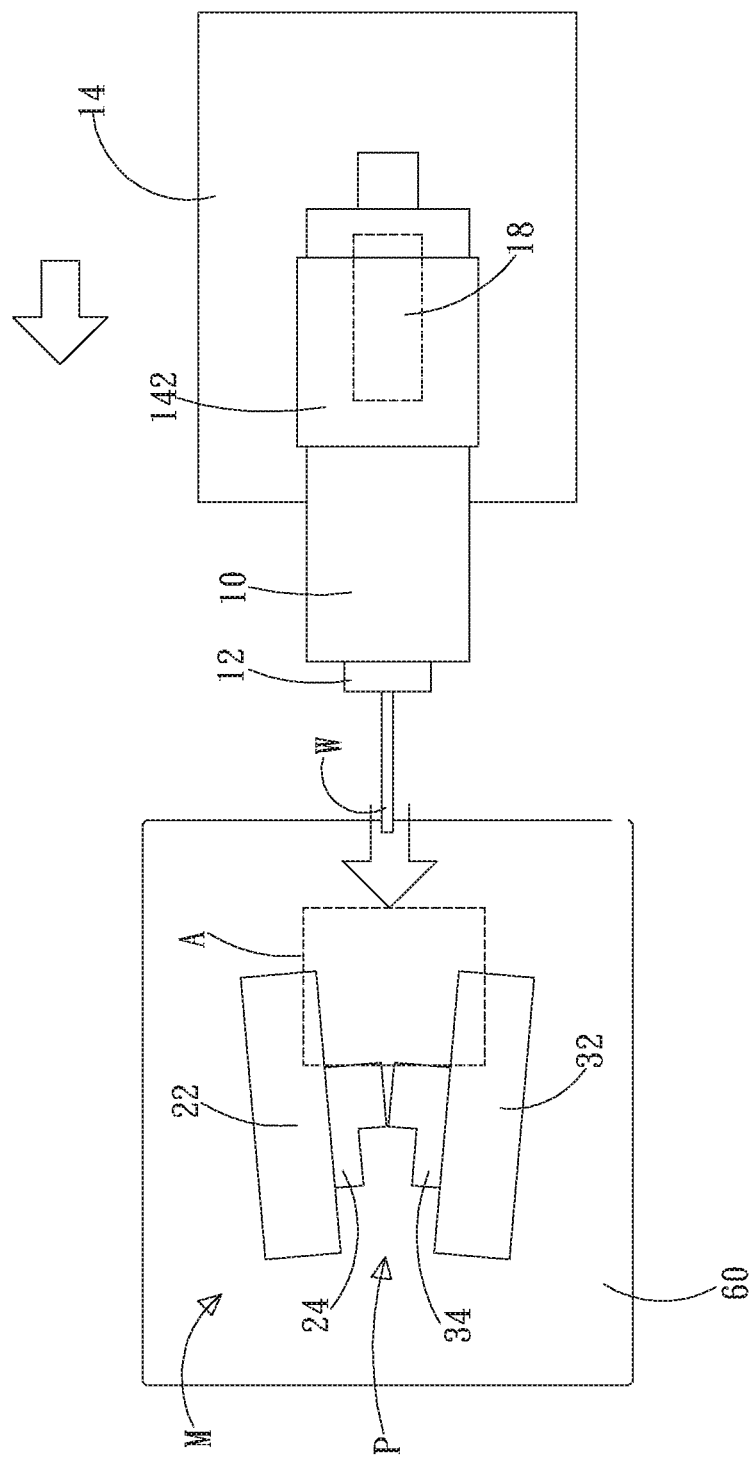
Figure 5C:
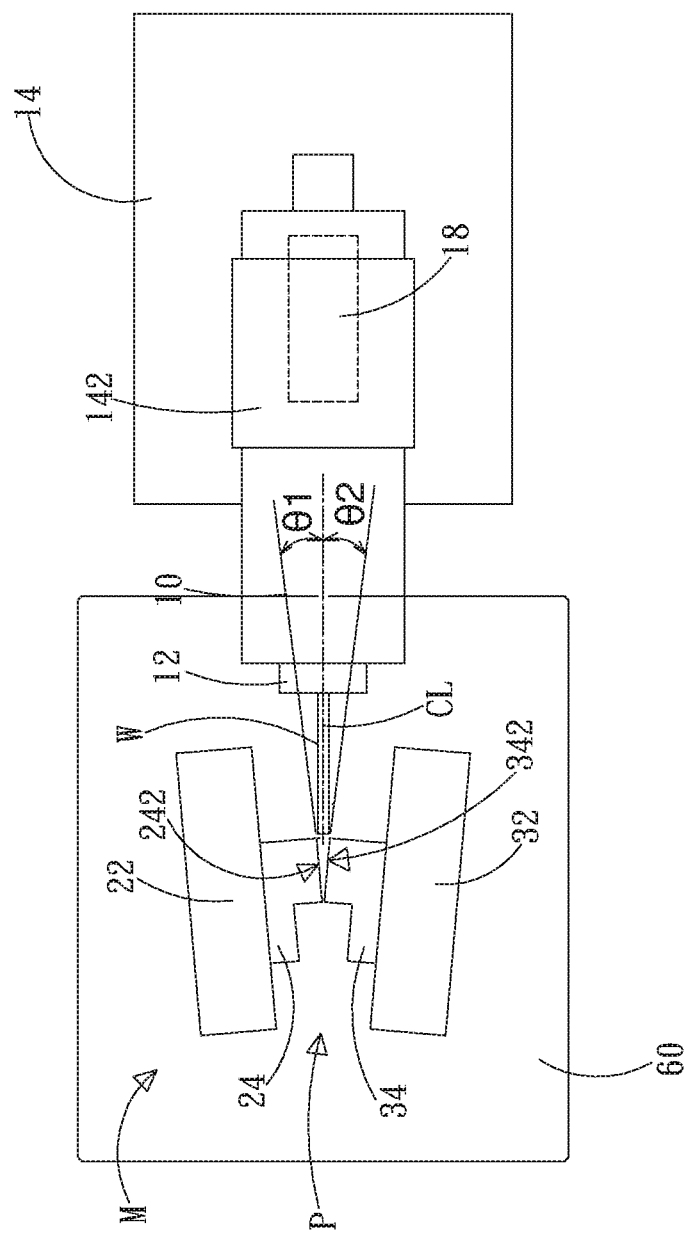

In the step S10, as shown in FIG. 5A, after the rod material to be grinded (the workpiece W) is held by the holding member 16 of the spinning shaft 10, the spinning shaft 10 is disposed to the driving member 14. Next, in the step S20, as shown in FIG. 5B, the spinning shaft 10 moves forward under the driving of the driving member 14 of the spinning shaft 10 to position the workpiece W to a processing location A. Afterwards, the step S30 is executed. As shown in FIG. 5C, the first adjusting structure 20 and the second adjusting structure 30 of the adjusting module M control the first grinding member 24 and the second grinding member 34 of the grinding module P, respectively. In addition, the first adjusting structure 20 and the second adjusting structure 30 are disposed symmetrically about the central line CL of the workpiece W. The first grinding member 24 and the second grinding member 34 are also disposed symmetrically. According to the present embodiment, by using the first adjusting structure 20 and the second adjusting structure 30, the angle between the first grinding surface 242 of the first grinding member 24 is the first angle $\theta1$ (for example, 1° to 22.5°, preferably 5° to 20°), and the angle between the second grinding surface 342 of the second grinding member 34 is the second angle $\theta2$ (for example, 1° to 22.5°, preferably 5° to 20°).

Figure 5D:
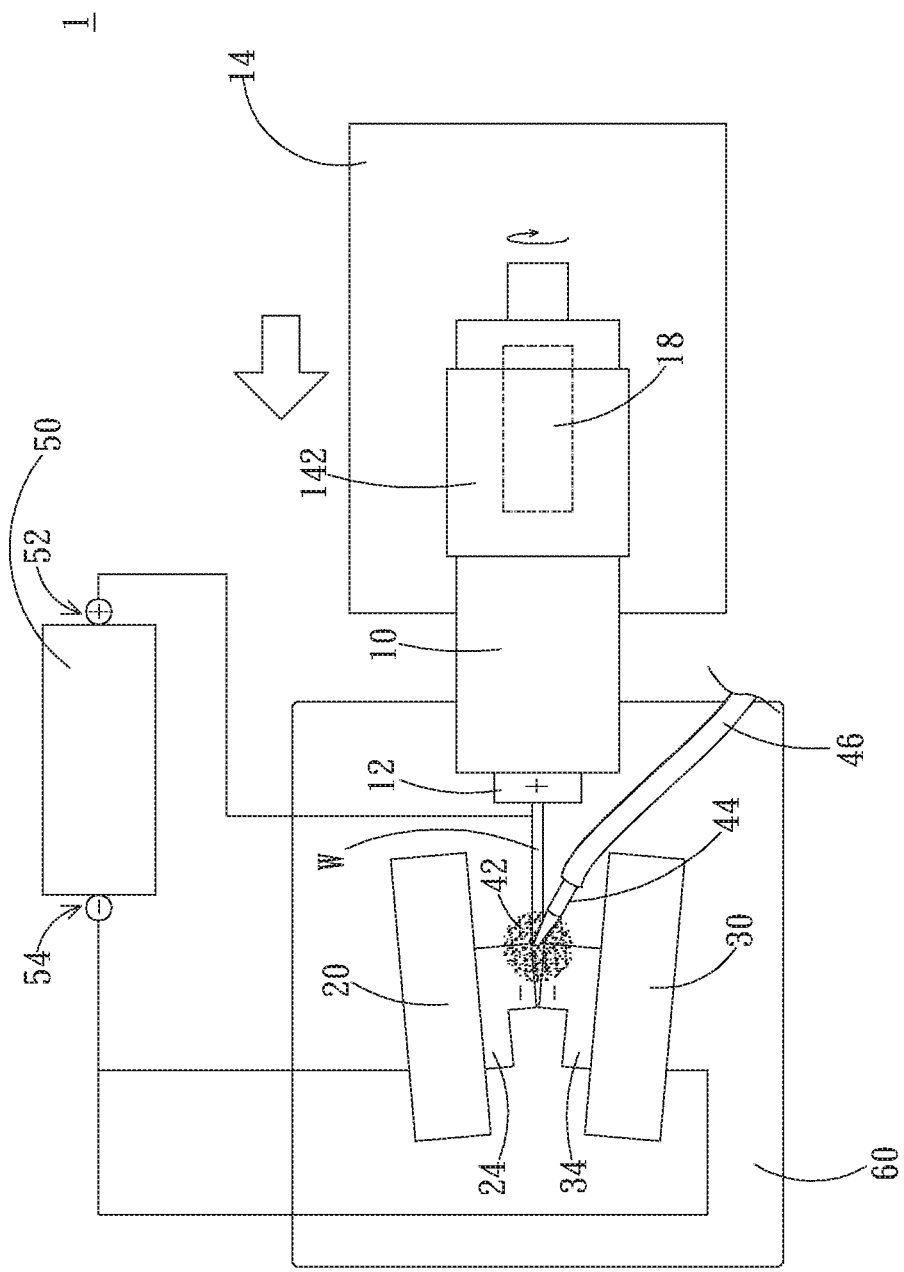
Figure 5E:
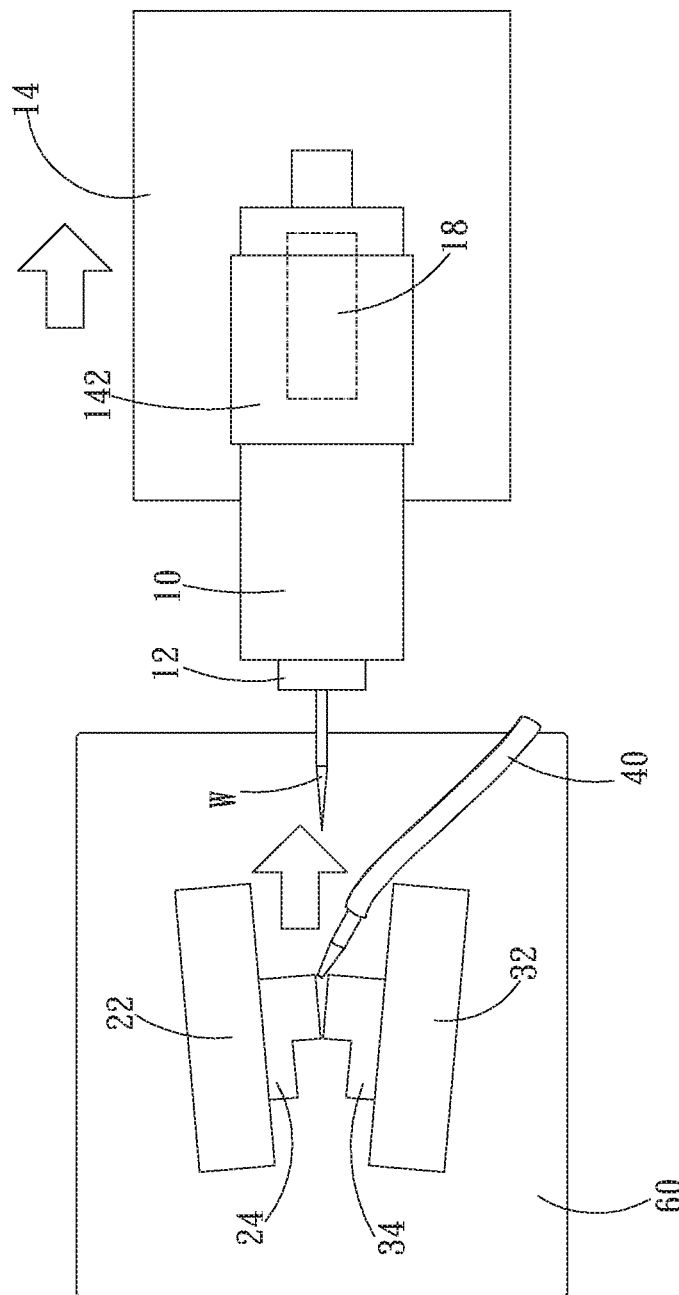

Next, in the step S40, as shown in FIG. 5D, start the spinning shaft 10 to spin and drive the workpiece W to spin accordingly. Then the spinning shaft 10 drives the workpiece W to proceed a processing distance D (for example, the processing distance D is greater than 200 micrometers, or smaller than or equal to 17 millimeters). Meanwhile, the electrolyte transport member 40 transports the electrolyte 42 to the space between the workpiece W and the grinding module P. In other words, the electrolyte 42 is transported to the space among the workpiece W, the first grinding member 24, and the second grinding member 32 for performing ECM to the workpiece W. The workpiece W is connected electrically to a positive electrode 52; the grinding module P is connected electrically to a negative electrode 54. Thereby, in the ECM process, one end of the workpiece W is gradually processed to a cone shape in the spinning process, as shown in FIG. 5E. When the workpiece W is processed to a probe shape and the desired tip length (for example, greater than 200 micrometers), the spinning shaft 10 is controlled to withdraw from the gap of angle between the first grinding member 24 and the second grinding member 32 under the driving of the driving member 14. Then, the power supply 50 is shot off and the fabrication of probe is completed. Given a fixed diameter of a workpiece, the tip length of a processed probe is inversely proportional to the tip angle.

In addition, the one or more negative terminal 54 according to the present invention can be disposed in parallel or in series electrically with the first adjusting structure 20 and the second adjusting structure 30 for connecting electrically to the first grinding member 24 and the second grinding member 32. According to the above embodiment, parallel connection of the one or more negative terminal 54 is adopted as an example. Nonetheless, the present invention is not limited to the embodiment.

According to the above description, the angle between the first grinding member 24 and the central line CL of the workpiece W is the first angle $\theta1$ and the angle between the second grinding member 32 and the central line CL of the workpiece W is the second angle $\theta2$. Both the first angle $\theta1$ and the second angle $\theta2$ are fixed angles. The driving member 14 drives the spinning shaft 10 to move forwards by the processing distance D for performing ECM on the workpiece W. Thereby, one end of the workpiece W is processed to a tip with a length greater than 200 micrometers, which can be used as a probe.

In addition to maintain a fixed angle for the grinding module P, the angle of the grinding module P can be further modulated for performing ECM, as described in detail as follows.

Figure 6:
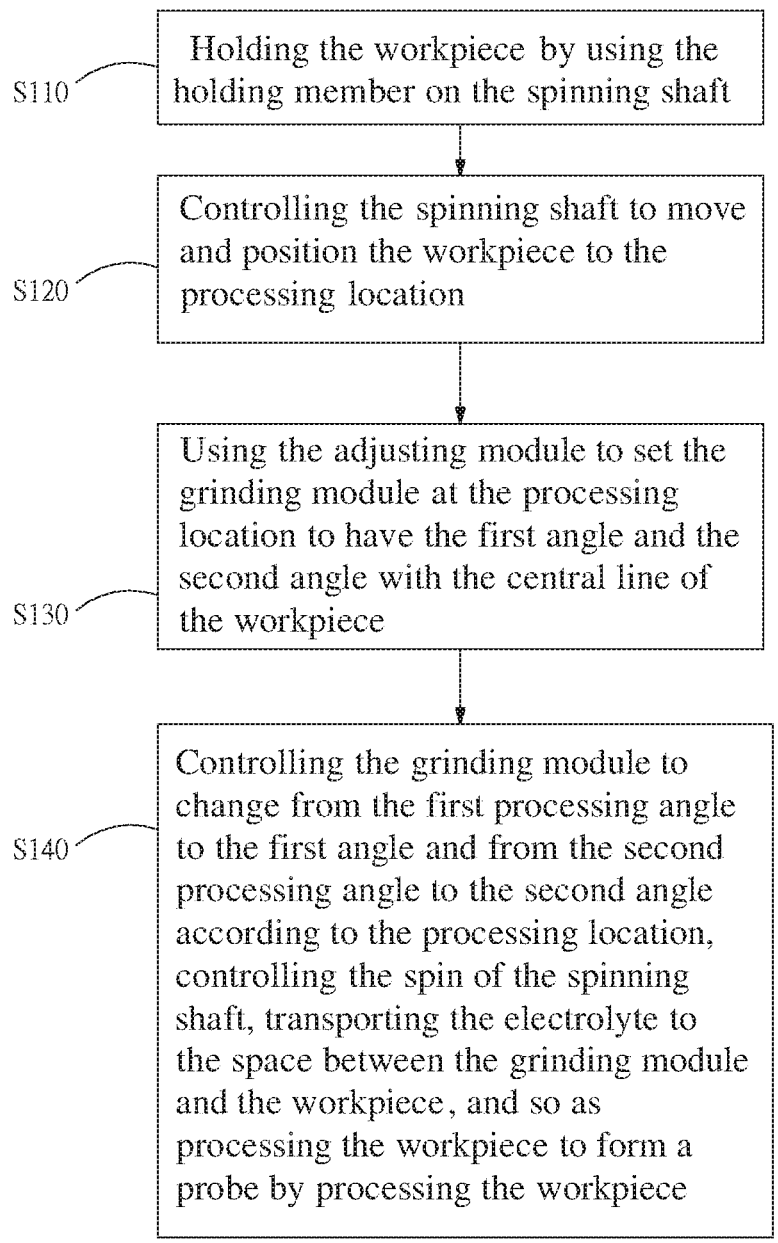
FIG. 6 shows a flowchart of the method according to another embodiment of the present invention.

Please refer to FIG. 6, which shows a flowchart of the method according to another embodiment of the present invention. As shown in the figure, the method for using probe processing device 1 comprises the following steps:

Step S110: Holding the workpiece by using the holding member on the spinning shaft;

Step S120: Controlling the spinning shaft to move and position the workpiece to the processing location;

Step S130: Using the adjusting module to set the grinding module at the processing location to have the first angle and the second angle with the central line of the workpiece; and Step S140: Controlling the grinding module to change from the first processing angle to the first angle and from the second processing angle to the second angle according to the processing location, controlling the spin of the spinning shaft, transporting the electrolyte to the space between the grinding module and the workpiece, and so as to form a probe by processing the workpiece.

The steps for using the device according to the present invention include the steps S110 to S140. To better describe the process of the method for processing probe, an example will used. Please refer to FIG. 7A to FIG. 7D, which show schematic diagrams of processing probe according to an embodiment of the present invention.

Figure 7A:
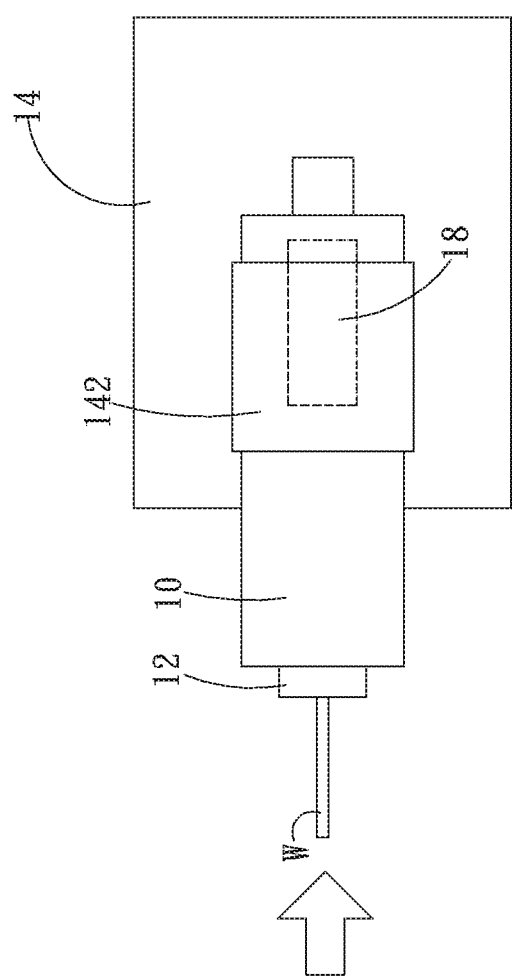
FIG. 7A to FIG. 7E show schematic diagrams of processing probe according to another embodiment of the present invention.
Figure 7B:
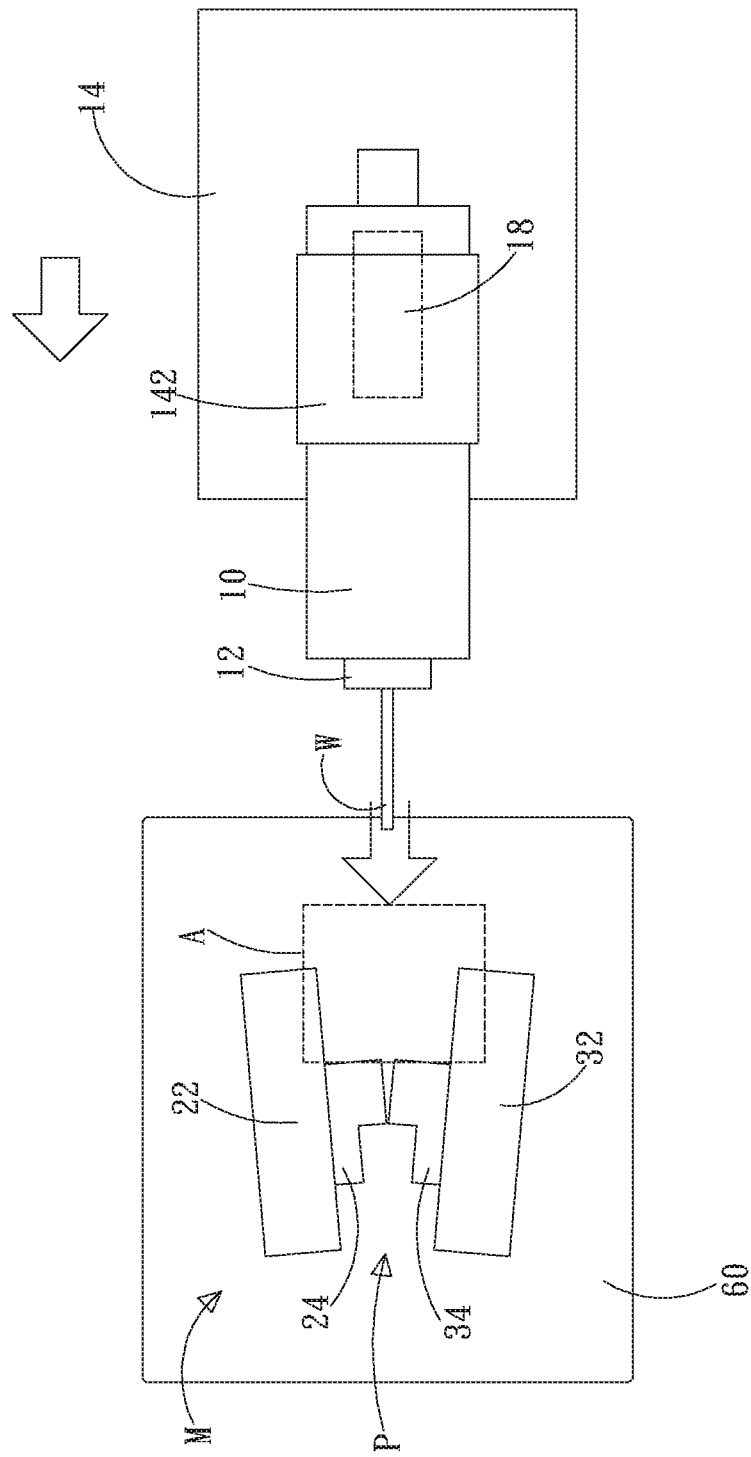
Figure 7C:
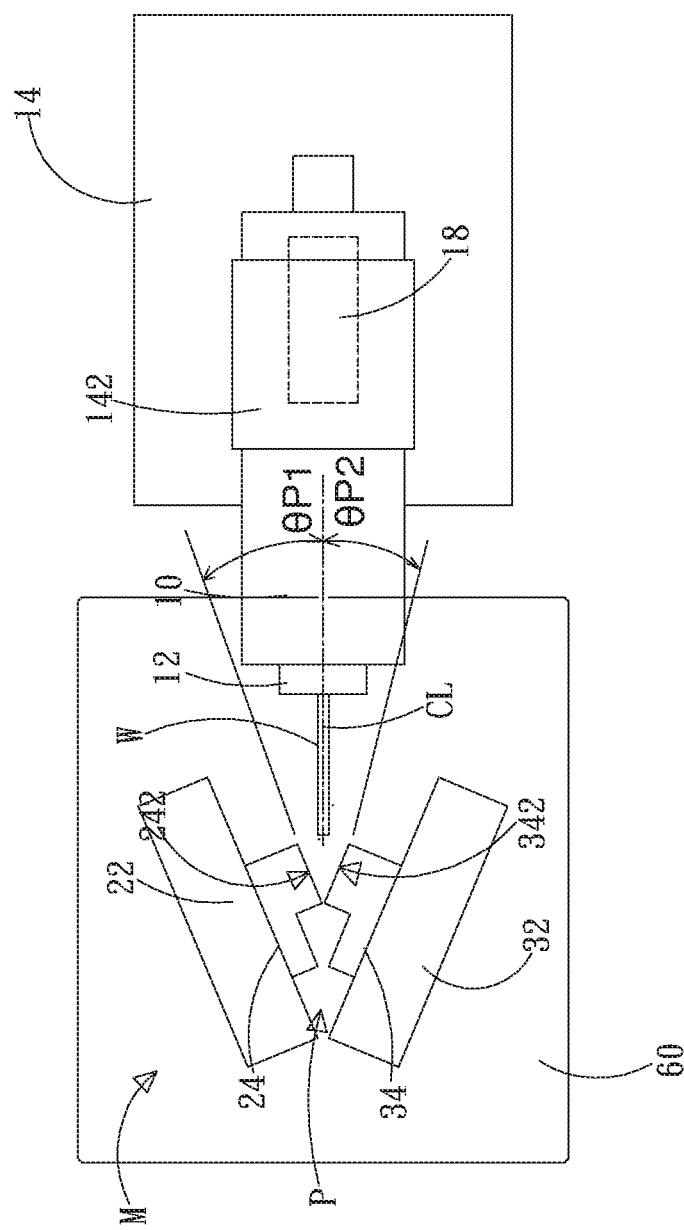
Figure 7D:
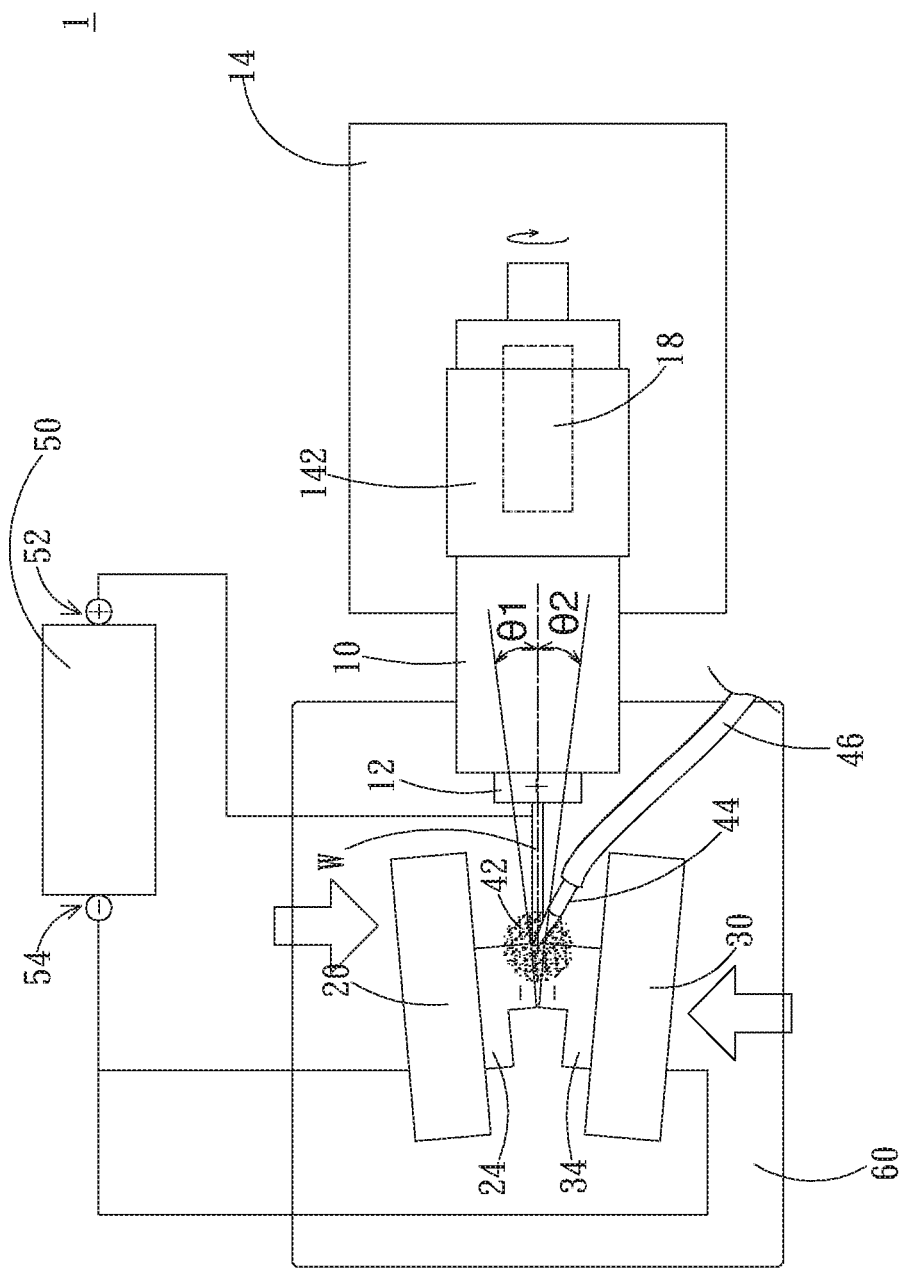
Figure 7E:
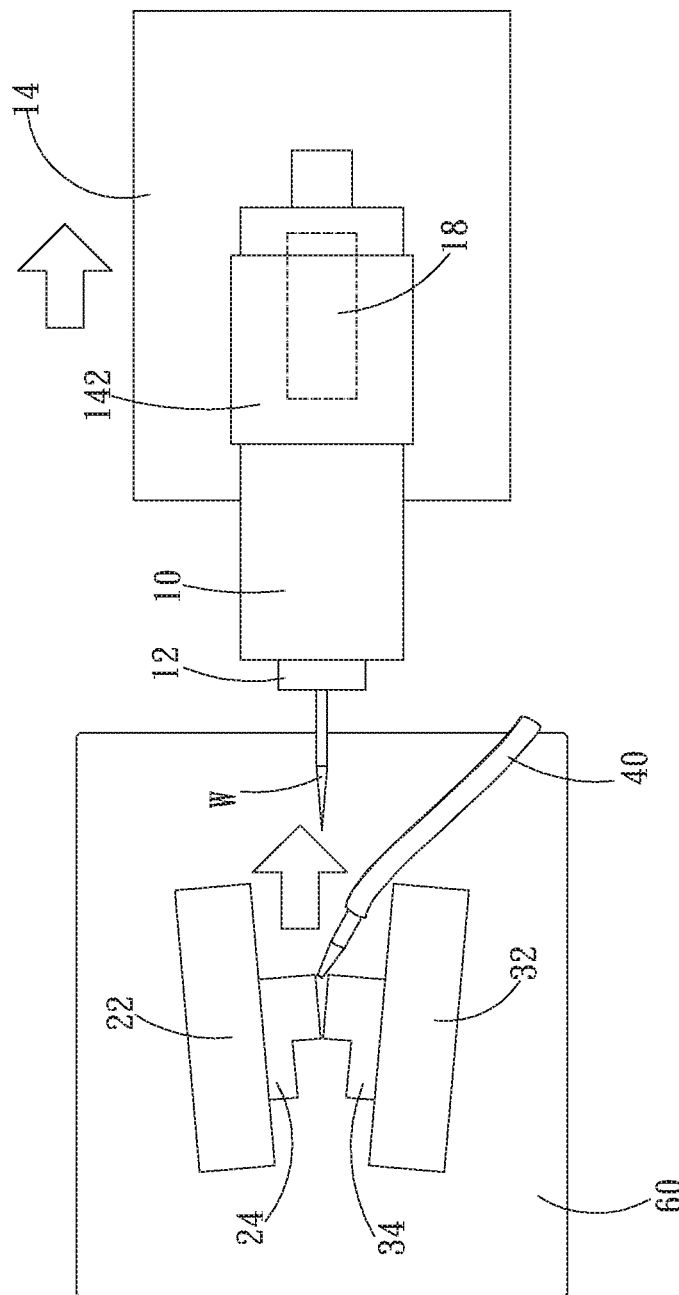

The description for the step S110 is identical the one for the step S10. Hence, the description will not be repeated. In the step S120, as shown in FIG. 7B, the spinning shaft 10 is driven by the driving member 16 to move and thus driving the workpiece W to move to the processing location A. In the step S130, the first adjusting structure 20 and the second adjusting structure 30 of the adjusting module M are disposed to the first driving motor 70 and the second driving motor 80, which drive the first adjusting structure 20 and the second adjusting structure 30 to move and thus driving the first grinding member 24 and the second grinding member 32. Thereby, a first processing angle θP1 is formed between the first grinding surface 242 of the first grinding member 24 and a second processing angle θP2 is formed between the second grinding surface 342 of the second grinding member 32. In addition, one or more positive electrode 52 of the power supply 50 is connected to the rod to be grinded; one or more negative electrode 54 of the power supply 50 is connected to the first grinding member 24 and the second grinding member 32. Next, in the step S140, according to the probe angle formed from the workpiece W, the first driving motor 70 and the second driving motor 80 are driven to drive the first adjusting structure 20 and the second adjusting structure 30 such that the angles of the first grinding member 24 and the second grinding member 32 are changed from the first processing angle θP1 and the second processing angle θP2 to the first angle θ1 and the second angle θ2. Meanwhile, in the period when the first grinding member 24 and the second grinding member 32 are changing angles, the spinning shaft 10 is not moving forward. Besides, in the period when the first grinding member 24 and the second grinding member 32 are changing angles, the spin of the spinning shaft 10 drives the workpiece W to spin accordingly. Then the electrolyte 42 is transported to the space among the workpiece W, the first grinding member 24, and the second grinding member 32 for performing ECM. As shown in FIG. 7E, as the workpiece W is shaped to a probe with a length of the desired tip length (for example, greater than 200 micrometers), the spinning shaft 10 is driven by the driving member 14 to withdraw the probe from the gap of the angle between the first grinding member 24 and the second grinding member 34. Afterwards, the power supply 50 is shut off and the fabrication of probe is completed.

According the method for processing probe according to the present invention, the probe processing device 1 can perform ECM by fixing the first angle θ1 and the second angle θ2 and enabling the spinning shaft 10 to move the workpiece W forward. Alternatively, the spinning shaft 10 is fixed for positioning the location of the workpiece W. Then the probe processing device 1 according to the present invention can match the angular requirement of the workpiece W by changing the angle between the first grinding member 24 and the second grinding member 34. In addition, the electrolysis procedure is applied to reduce the hardness of the workpiece W as well as lower the consumption of the first grinding member 24 and the second grinding member 34. According to the present invention, no special design of the geometric shapes of the first grinding member 24 and the second grinding member 34 is required for manufacturing probes. Instead, the requirement in angle can be achieved by using the first adjusting structure 20 and the second adjusting structure 30. Moreover, the control on the electric field in the probe processing device 1 according to the present invention is easier than in the ECM.

Figure 8A:
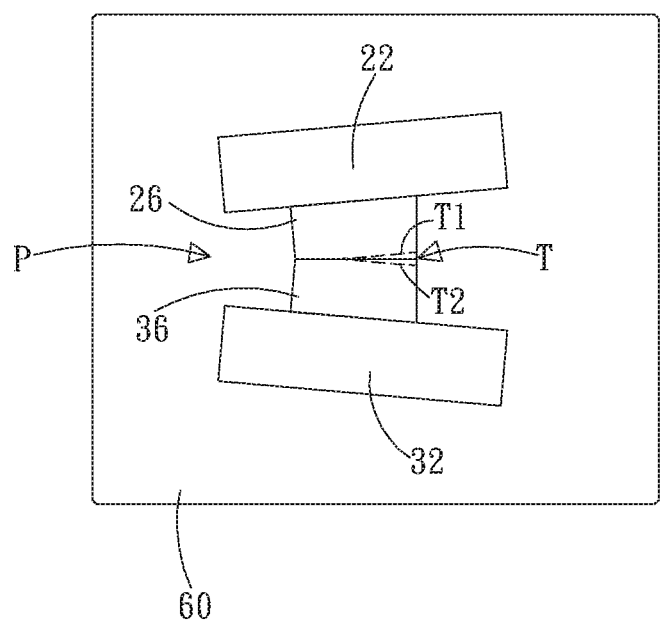
FIG. 8A shows a top view of the device according to another embodiment of the present invention.
Figure 8B:
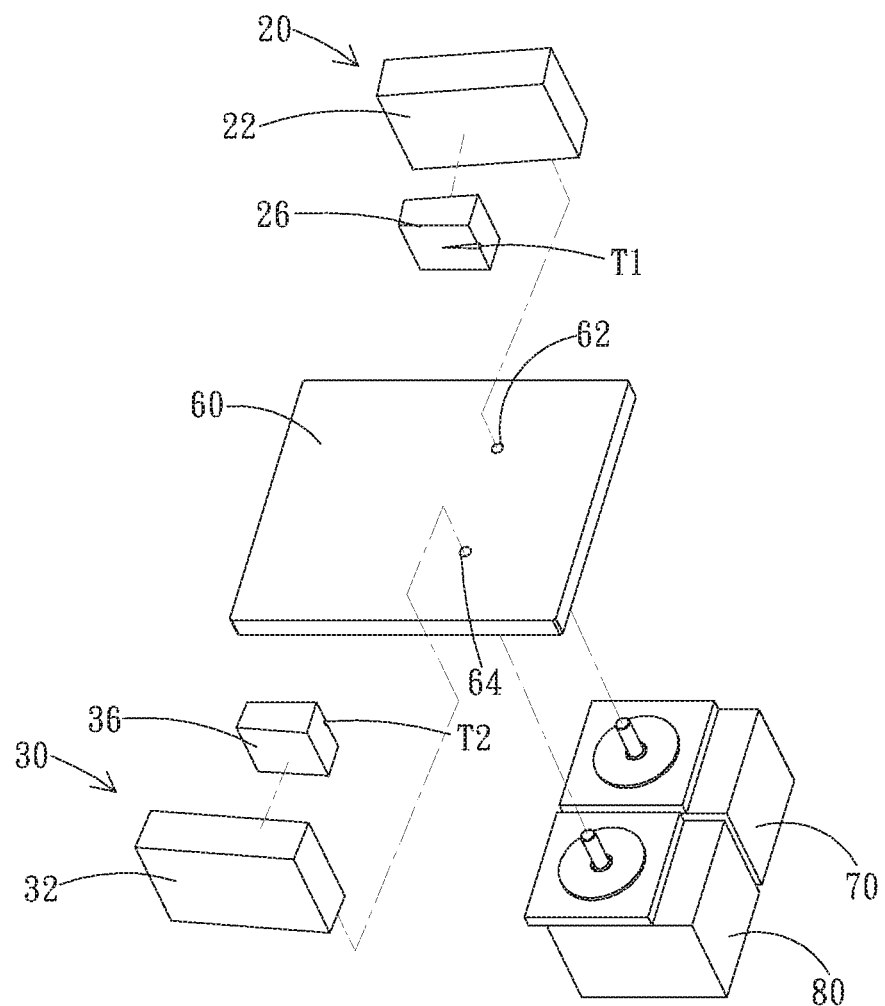
FIG. 8B shows an exploded view of the device according to another embodiment of the present invention.

The first grinding member 24 and the second grinding member 32 as described above are designed to be disposed at the first adjusting structure 20 and the second adjusting structure 30 separately. As shown in FIG. 8A and FIG. 8B, the first grinding member 24 and the second grinding member 32 can further be an assemblable mold. By forming a cone-shaped recess T in the assemblable mold, ECM can be performed to one end of the workpiece W. The electrolyte 42 is transported to the space between the cone-shaped recess T and the workpiece W for being applied to the fixed-angle embodiment as described above. As shown in FIG. 8B, by disassembling the first grinding member 26 and the second grinding member 36, the cone-shaped recess T corresponds to a first recess T1 and a second recess T2, respectively, disposed at the first grinding member 26 and the second grinding member 36, respectively. Thereby, the grinding surface is in the cone-shaped recess T. The rest connection is identical the previous embodiment. Hence, the details will not be repeated. Moreover, the diameter of the workpiece W is 0.5 to 1 millimeter.

The present invention provides a method for processing probe, which can shorten the processing time, increase the production efficiency, reduce the consumption of grinding members, and process to produce probes rapidly. The probe processing device uses an angle adjusting member to adjust the angle of probe tip after forming. In addition, negative charges are provided to the workpiece and positive charges are provided to the angle adjusting member. By using the electrolyte, the workpiece and the angle adjusting member connected electrically to form the required shape of probes.

What is claimed is:

1. A method for processing probe, comprising steps of:
holding a workpiece by using a holding member on a spinning shaft;
controlling said spinning shaft to move said workpiece to a processing location;
using an adjusting module to set a grinding module at said processing location to form a first angle and a second angle with the central line of a workpiece; and
controlling said spinning shaft to move forward a processing distance and rotate according to said processing location, transporting an electrolyte to a space between said grinding module and said workpiece in the meanwhile so as to form a probe by processing said workpiece;
wherein said processing distance is inversely proportional to said first angle and said second angle; said workpiece or said spinning shaft is connected electrically to a positive electrode of a power supply; and said grinding module is connected electrically to a negative electrode of said power supply.

2. The method for processing probe of claim 1, wherein said step of using said adjusting module to set said grinding module at said processing location to form said first angle and said second angle with the central line of said workpiece, a first adjusting structure of said adjusting module is used to set a first grinding surface of a first grinding member of said grinding module to form the first angle with the central line of said workpiece, and a second adjusting structure of said adjusting module is used to set a second grinding surface of a second grinding member of said grinding module to form the second angle with the central line of said workpiece.

3. The method for processing probe of claim 1, wherein said first angle is equal to said second angle.

4. The method for processing probe of claim 1, wherein said first angle and said second angle range between 1° and 22.5°.

5. The method for processing probe of claim 1, wherein said processing distance ranges from greater than 200 micrometers to smaller than or equal to 17 millimeters.

6. The method for processing probe of claim 1, wherein said step of holding the workpiece using the holding member on the spinning shaft, a spin driver and said holding member are connected.

7. A method for processing probe, comprising steps of: holding a workpiece by using a holding member on a spinning shaft; controlling said spinning shaft to move and position said workpiece to a processing location; using an adjusting module to set a grinding module at said processing location to have a first processing angle and a second processing angle with the central line of the workpiece; and controlling said grinding module to change the angles from said first processing angle to a first angle and from said second processing angle to a second angle according to said processing location, controlling the spin of said spinning shaft, transporting an electrolyte to the space between said grinding module and said workpiece, and so as to form a probe by processing said workpiece; wherein said first processing angle is greater than said first angle; said second processing angle is greater than said second angle; said workpiece or said spinning shaft is connected electrically to a positive electrode of a power supply; and said grinding module is connected electrically to a negative electrode of said power supply.

8. The method for processing probe of claim 7, wherein said step of using adjusting module to set the grinding module at said processing location to have the first processing angle and the second processing angle with the central line of the workpiece, a first adjusting structure of said adjusting module is used to set a first grinding member of said grinding module to have the first angle with the central line of said workpiece, and a second adjusting structure of said adjusting module is used to set a second grinding member of said grinding module to have the second angle with the central line of said workpiece.

9. The method for processing probe of claim 7, wherein said first angle is equal to said second angle.

10. The method for processing probe of claim 7, wherein said first angle and said second angle range between 1° and 22.5°.

* * * * *